(12) United States Patent
Lacroix et al.

(10) Patent No.: US 7,119,152 B1
(45) Date of Patent: *Oct. 10, 2006

(54) THERMOPLASTIC POLYESTER COMPOSITIONS HAVING IMPROVED IMPACT PROPERTIES

(75) Inventors: Christophe Lacroix, Bernay (FR); Alain Bouilloux, Bernay (FR)

(73) Assignee: ATOFINA, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/718,427

(22) Filed: Nov. 24, 2000

(30) Foreign Application Priority Data

Nov. 26, 1999 (FR) .................................. 99 14915

(51) Int. Cl.
*C08L 65/00* (2006.01)

(52) U.S. Cl. .......................... 525/445; 525/64; 525/65; 525/70; 525/80; 525/902

(58) Field of Classification Search .................. 525/64, 525/166
See application file for complete search history.

(56) References Cited

U.S. PATENT DOCUMENTS

| | | | |
|---|---|---|---|
| 3,287,443 A | 11/1966 | Saito et al. | |
| 3,657,391 A | 4/1972 | Curfman | |
| 3,808,180 A | 4/1974 | Owens | |
| 3,985,704 A | 10/1976 | Jones et al. | |
| 4,096,202 A | 6/1978 | Farnham et al. | |
| 4,180,494 A | 12/1979 | Fromuth et al. | |
| 4,260,693 A | 4/1981 | Liu | |
| 4,299,928 A | 11/1981 | Witman | |
| 4,476,274 A | 10/1984 | Liu | |
| 4,659,767 A | 4/1987 | Dunkle et al. | |
| 4,753,890 A | 6/1988 | Smith-Lewis et al. | |
| 4,880,876 A | 11/1989 | Hub et al. | |
| 4,912,163 A * | 3/1990 | Lausberg et al. .............. | 525/67 |
| 4,966,942 A * | 10/1990 | Sasaki .......................... | 525/67 |
| 5,308,894 A * | 5/1994 | Laughner .................... | 523/436 |
| 5,369,154 A * | 11/1994 | Laughner .................... | 523/436 |
| 5,652,306 A | 7/1997 | Meyer et al. | |
| 5,814,712 A | 9/1998 | Gallucci et al. | |
| 5,854,346 A | 12/1998 | Meyer et al. | |
| 6,020,414 A | 2/2000 | Nelsen et al. | |
| 6,809,151 B1 * | 10/2004 | Lacroix et al. ............... | 525/64 |
| 7,015,261 B1 * | 3/2006 | Zerafati et al. ............. | 523/201 |

FOREIGN PATENT DOCUMENTS

| | | | |
|---|---|---|---|
| EP | 0 133 993 A | | 3/1985 |
| EP | 0 491 985 A | | 7/1992 |
| EP | 0491985 | * | 7/1992 |
| EP | 0 511 475 A | | 11/1992 |
| EP | 0 531 008 A | | 3/1993 |
| EP | 0531008 | * | 3/1993 |
| EP | 0 573 680 A | | 12/1993 |
| EP | 0573680 | * | 12/1993 |
| EP | 0 737 715 A | | 10/1996 |
| JP | 62-285947 | * | 12/1987 |
| JP | 1247454 | | 10/1989 |

* cited by examiner

*Primary Examiner*—Marc S. Zimmer
(74) *Attorney, Agent, or Firm*—Smith, Gambrell & Russell, LLP

(57) ABSTRACT

The present invention relates to thermoplastic polyesters, which comprise, by weight:
(i) a thermoplastic polyester;
(ii) an impact modifier comprising:
  (a) a core-shell copolymer (A);
  (b) an ethylene copolymer (B) chosen from ethylene-unsaturated carboxylic acid anhydride copolymers (B1), ethylene-unsaturated epoxide copolymers (B2) and blends thereof;
(iii) the (B)/(A) ratio being between 40/60 and 10/90 for proportions of impact modifier between 18 and 40% in 82 to 60% of polyester, respectively;
(iv) the (B)/(A) ratio being between 40/60 and 25/75 for proportions of impact modifier between 2 and 18% in 98 to 82% of polyester, respectively. It is particularly useful for PET and PBT.

7 Claims, 3 Drawing Sheets

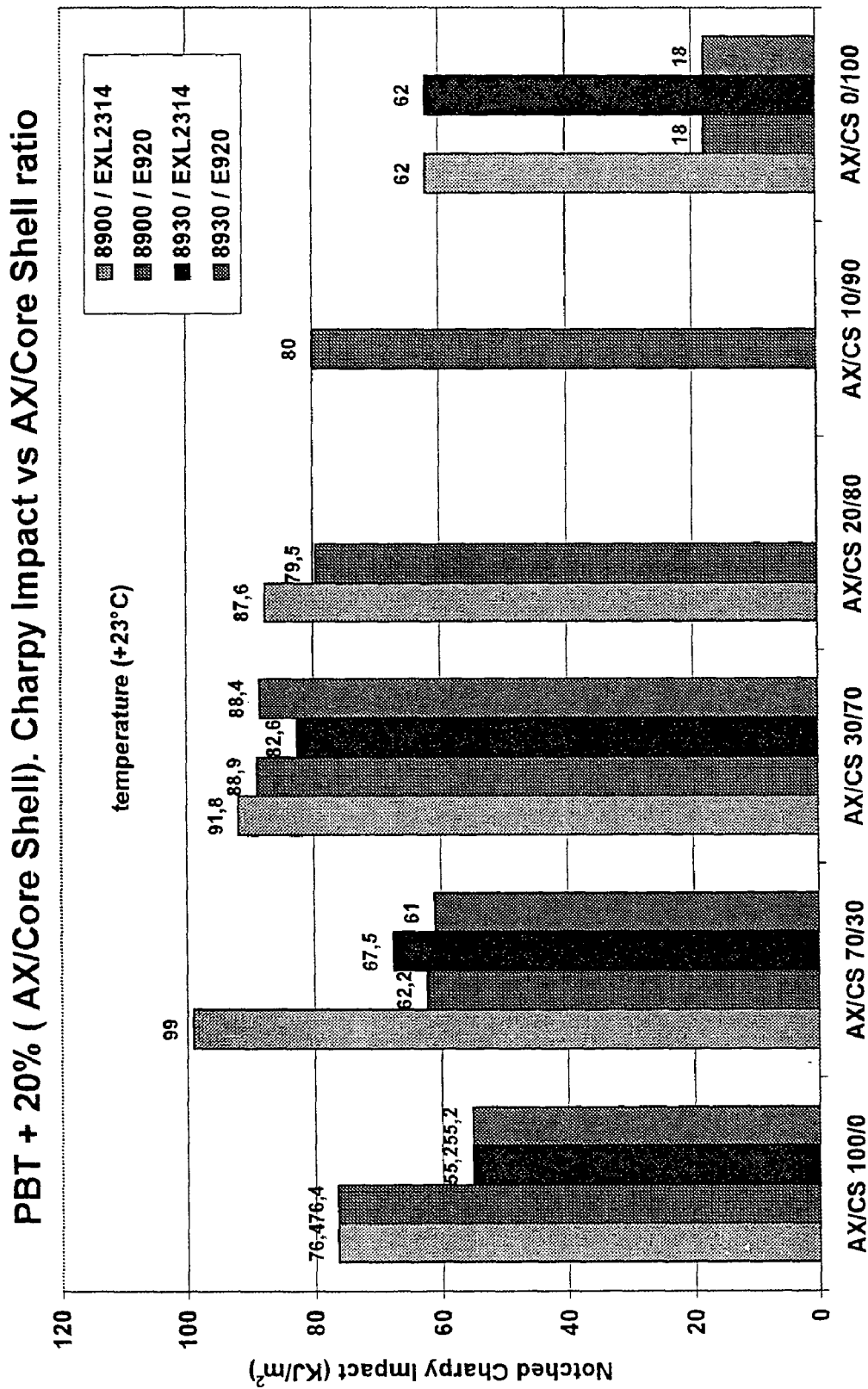

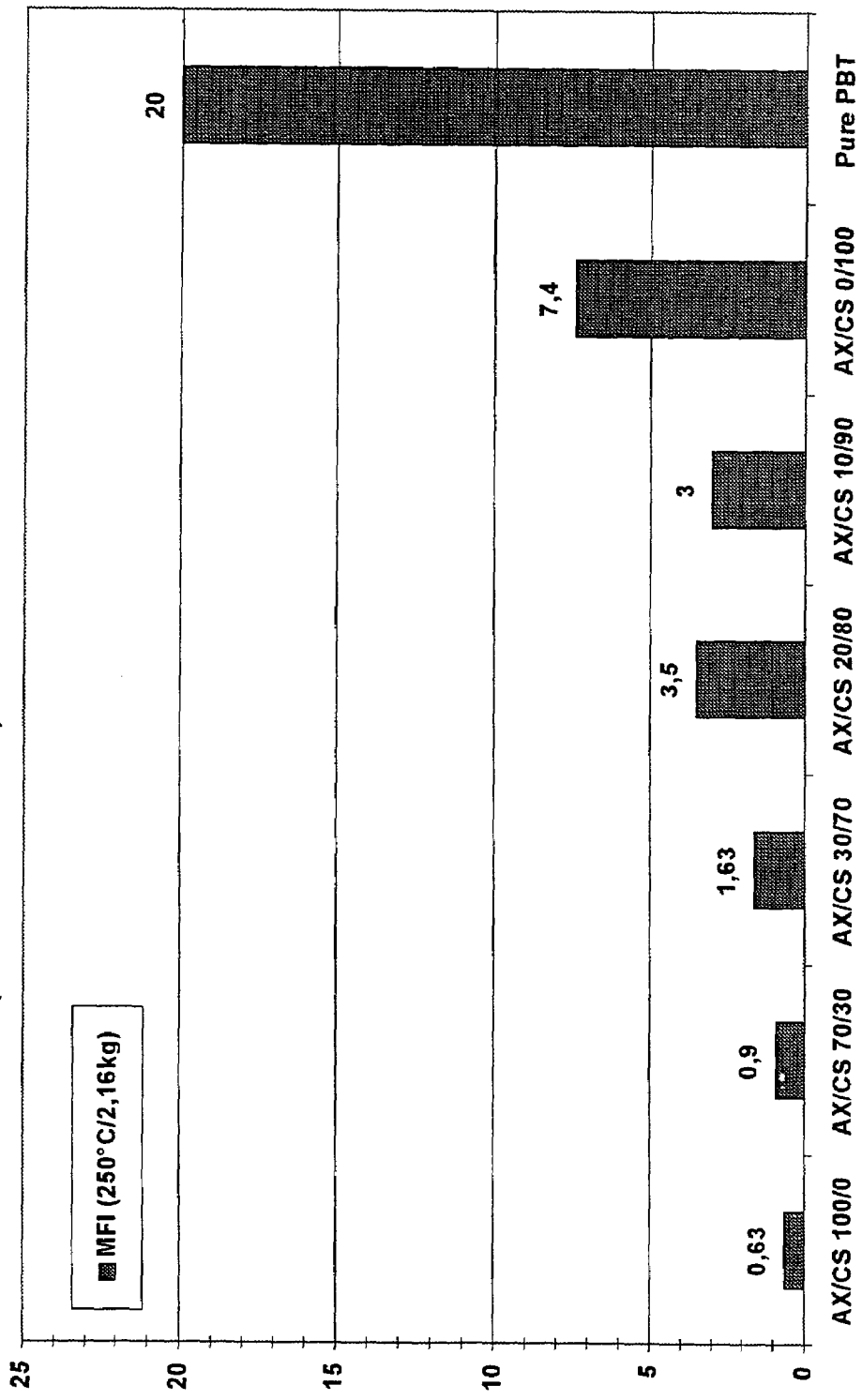

THERMOPLASTIC POLYESTER COMPOSITIONS HAVING IMPROVED IMPACT PROPERTIES

FIELD OF THE INVENTION

The present invention relates to thermoplastic polyesters having improved impact properties and to impact-modifier compositions.

Thermoplastic polyesters, such as PBT (polybutylene terephthalate) and PET (polyethylene terephthalate) possess excellent dimensional-stability, heat-resistance and chemical-resistance properties and are used in the electrical, electronic and motor-vehicle fields. However, at high temperature, during conversion operations, a reduction in the molecular weight of the polymer may occur, leading to a reduction in the impact properties. In addition, polyesters have poor fracture-resistance properties in the case of notched components.

The present invention provides thermoplastic polymers in which an impact-modifier composition is added in order to obtain improved impact properties, especially low-temperature toughness. The present invention also relates to this impact-modifier composition that is added to the polyesters to improve the impact properties thereof. These modifier compositions make it possible to achieve impact properties superior to those obtained with each of the compounds separately.

BACKGROUND OF THE INVENTION

U.S. Pat. No. 4,753,890 (=EP 174,343) describes polyesters, such as, for example, polyethylene terephthalate (PET) or polybutylene terephthalate (PBT), which are modified by ethylene-alkyl(meth)acrylate-glycidyl (meth)acrylate copolymers.

U.S. Pat. No. 5,369,154 describes PET/polycarbonate blends containing four different modifiers: a copolymer comprising an epoxide, a copolymer of the core-shell type, an SBR- or SBS- or EPR-type elastomer and a copolymer of the SAN or ABS type. These core-shell copolymers comprise fine particles having an elastomer core and a thermoplastic shell.

Patent EP 115,015 describes PET or PBT containing linear low-density polyethylene (LLDPE), glass fibres and optionally a core-shell copolymer.

Patent EP 133,993 describes PET containing a core-shell copolymer and a copolymer of ethylene with either an alkyl acrylate or (meth)acrylic acid.

Japanese Patent Application JP 01,247,454 A, published on 3 Oct. 1989 describes PBT containing an ethylene-alkyl (meth)acrylate copolymer and an ethylene-glycidyl methacrylate copolymer.

Patents EP 838,501 and EP 511,475 describe compositions similar to those of the above Japanese application.

Patent EP 803,537 describes PET and polycarbonate containing a copolymer comprising glycidyl methacrylate. Firstly, the polycarbonate and the copolymer comprising glycidyl methacrylate are blended together and then this blend is incorporated into the PET.

Patent EP 187,650 describes PET containing a core-shell copolymer and a copolymer of ethylene with either maleic anhydride or a (meth)acrylic acid.

Patent EP 737,715 describes PBTs modified by an impact modifier consisting of an ethylene-methyl methacrylate-glycidyl methacrylate copolymer/core-shell copolymer blend. The amount of impact modifier is from 5 to 20 parts per 100 parts of polyester, i.e. 4.8 to 16.7% for 95.2 to 83.7% of polyester, respectively. The proportions of the glycidyl methacrylate copolymer to the core-shell copolymer are in the ratio 15/85 to 20/80. In the examples, the amount of impact modifier is from 18 parts per 100 parts of polyester, i.e. 15.3%, and the proportion of glycidyl methacrylate copolymer to the core-shell copolymer is in the ratio 3/15, i.e. 17/83.

Patent EP 531,008 describes spent (recycled) PBT/polycarbonate (PC) blends containing core-shell copolymers, to which functionalized copolymers are added in order to make them into a new thermoplastic. These functionalized copolymers are either ethylene-glycidyl methacrylate (GMA) copolymers or ethylene-vinyl acetate-glycidyl methacrylate copolymers. The description quotes proportions of 1 to 97% of polycarbonate, from 1 to 97% of PBT, 1 to 40% of core-shell copolymer and 1 to 40% of glycidyl methacrylate copolymer. In fact, the PBT/polycarbonate blends that it is desired to recycle contain, according to the examples, 15% of core-shell copolymer, which corresponds to more realistic values. Blends (i) of 80 parts of recycled material with 20 parts of glycidyl methacrylate copolymer and blends (ii) of 90 parts of recycled material with 10 parts of glycidyl methacrylate copolymer are then made. The proportions are in the EP 531,008 table below, in which the parts are by weight:

TABLE

EP 531 008

| | Compositions such that the core-shell copolymer/PC + PBT ratio = 15/85 | | |
|---|---|---|---|
| PC + PBT | 85 | 68 | 76.5 |
| Core-shell copolymer (CS) | 15 | 12 | 13.5 |
| GMA copolymer | | 20 | 10 |
| PC + PBT + CS + GMA copolymer | 100 | 100 | 100 |
| GMA/CS copolymer | | 20/12 = (62/38) | 10/13.5 = (43/57) |
| Proportion of modifier (Core-shell copolymer + GMA copolymer) in PC + PBT | | 20 + 12 = 32% | 10 + 13.5 = 23.5% |

BRIEF DESCRIPTION OF THE DRAWINGS

FIG. 2 is a diagram illustrating the Charpy Impact vs AX/Core Shell ratio at +23° C.; and FIG. 3 is a diagram illustrating the MFI vs AX/Core Shell ratio at 250° C.

Figure 1:
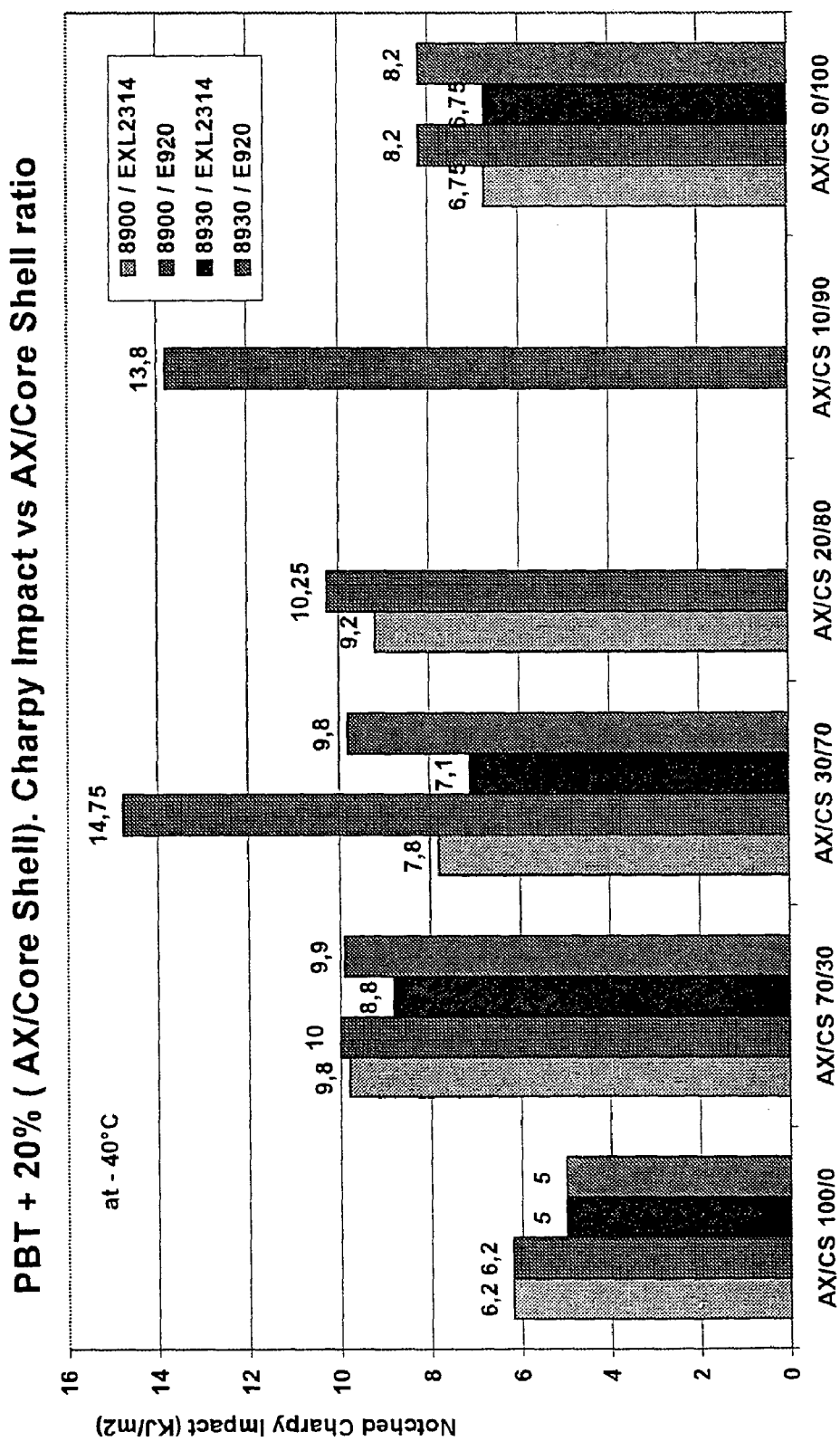
FIG. 1 is a diagram illustrating the Charpy Impact vs AX/Core Shell ratio at −40° C.

It has been seen from the prior art that saturated polyesters can have their impact properties improved by the addition of a core-shell copolymer. These polymers have a particularly well defined structure in which the core consists of a polymer having an elastomeric character and the shell has a thermoplastic character. It has also been seen that the improvement in impact strength may be obtained by also incorporating a dispersed phase of an impact modifier optionally containing reactive functional groups capable of reacting with the functional groups of the polyesters. This reactivity makes it possible to ensure a fine and homogeneous dispersion of the modifier as well as good adhesion. The core-shell copolymer may itself also be functionalized in order to allow better adhesion to the matrix. However, this reactivity is sometimes high and may lead to a reduction in the melt flow index. This reduction in the melt flow index is prejudicial to the injection moulding of large parts or of fine parts.

It has now been found that it is possible to improve the impact properties of thermoplastic polyesters by adding two kinds of modifier to them, namely (a) a core-shell copolymer and (b) either an ethylene-unsaturated epoxide copolymer or an ethylene-carboxylic acid anhydride copolymer, or a blend of these but in proportions in the polyester and in (b)/(a) ratios which are different from those of the prior art EP 737,715 and EP 531,008. Better impact strength is obtained, while maintaining and even improving the melt flow index.

DETAILED DESCRIPTION OF THE EMBODIMENTS

The present invention relates to thermoplastic polyester compositions comprising, by weight:
(i) a thermoplastic polyester;
(ii) an impact modifier comprising:
  (a) a core-shell copolymer (A);
  (b) an ethylene copolymer (B) chosen from ethylene-unsaturated carboxylic acid anhydride copolymers (B1), ethylene-unsaturated epoxide copolymers (B2) and blends thereof;
(iii) the (B)/(A) ratio being between 40/60 and 10/90 for proportions of impact modifier between 18 and 40% in 82 to 60% of polyester, respectively;
(iv) the (B)/(A) ratio being between 40/60 and 25/75 for proportions of impact modifier between 2 and 18% in 98 to 82% of polyester, respectively, and advantageously between 5 and 18% in 95 to 82% of polyester, respectively.

The present invention also relates to an impact-modifier composition which can be added to the thermoplastic polyesters to improve their impact properties and comprising:
  (a) a core-shell copolymer (A);
  (b) an ethylene copolymer (B) chosen from ethylene-unsaturated carboxylic acid anhydride copolymers (B1) and ethylene-unsaturated epoxide copolymers (B2);
  the (B)/(A) ratio being between 40/60 and 10/90 for proportions of impact modifier between 18 and 40% in 82 to 60% of polyester, respectively,
  the (B)/(A) ratio being between 40/60 and 25/75 for proportions of impact modifier between 2 and 18% in 98 to 82% of polyester, respectively, and advantageously between 5 and 18% in 95 to 82% of polyester, respectively.

DETAILED DESCRIPTION OF THE INVENTION

The term "thermoplastic polyester" denotes polymers which are saturated products coming from the condensation of glycols and of dicarboxylic acids, or of their derivatives. Preferably, they comprise the products of the condensation of aromatic dicarboxylic acids having from 8 to 14 carbon atoms and of at least one glycol chosen from the group consisting of neopentyl glycol, cyclohexanedimethanol and aliphatic glycols of formula $HO(CH_2)_nOH$ in which n is an integer ranging from 2 to 10. Up to 50 mol % of the aromatic dicarboxylic acid may be replaced with at least one other aromatic dicarboxylic acid having from 8 to 14 carbon atoms, and/or up to 20 mol % may be replaced with an aliphatic dicarboxylic acid having from 2 to 12 carbon atoms.

The preferred polyesters are polyethylene terephthalate (PET), poly(1,4-butylene) terephthalate (PBT), 1,4-cyclohexylene dimethylene terephthalate/isophthalate) and other esters derived from aromatic dicarboxylic acids such as isophthalic acid, dibenzoic acid, naphthalene dicarboxylic acid, 4,4'-diphenylenedicarboxylic acid, bis(p-carboxyphenyl)methane acid, ethylene bis(p-benzoic) acid, 1,4-tetramethylene bis(p-oxybenzoic) acid, ethylene bis(para-oxybenzoic) acid, 1,3-trimethylene bis(p-oxybenzoic) acid, and glycols such as ethylene glycol, 1,3-trimethylene glycol, 1,4-tetramethylene glycol, 1,6-hexamethylene glycol, 1,3-propylene glycol, 1,8-octamethylene glycol and 1,10-decamethylene glycol. The MFI of these polyesters, measured at 250° C. and with 2.16 kg, may vary from 2 to 100 and advantageously from 10 to 80. "MFI" denotes the melt flow index.

It would not be outside the scope of the invention if the polyesters consisted of several diacids and/or several diols. It is also possible to use a blend of various polyesters.

It would not be outside the scope of the invention if the polyesters contained copolyetheresters. These copolyetheresters are copolymers containing polyester blocks and polyether blocks having polyether units derived from polyetherdiols such as polyethylene glycol (PEG), polypropylene glycol (PPG) or polytetramethylene glycol (PTMG), dicarboxylic acid units such as terephthalic acid units, and short, chain-extender, diol units such as glycol (ethanediol) or 1,4-butanediol. The linking of the polyethers with the diacids forms the flexible segments whereas the linking of the glycol or butanediol with the diacids forms the rigid segments of the copolyetherester. These copolyetheresters are thermoplastic elastomers. The proportion of these copolyetheresters may represent up to 30 parts per 100 parts of thermoplastic polyester.

It would not be outside the scope of the invention if the polyesters contained polycarbonate. In general, the term "polycarbonate" denotes polymers comprising the following units:

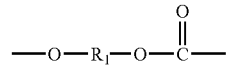

in which $R_1$ is an aliphatic, alicyclic or aromatic divalent group; the aliphatic and alicyclic groups may contain up to 8 carbon atoms. By way of example of $R_1$, mention may be made of ethylene, propylene, trimethylene, tetramethylene, hexamethylene, dodecamethylene, poly(1,4-[2-butenylene]), poly(1,10-[(2-ethyldecylene]), 1,3-cyclopentylene, 1,3-cyclohexylene, 1,4-cyclohexylene, m-phenylene, p-phenylene, 4,4'-diphenylene, 2,2-bis(4-phenylene)propane and benzene-1,4-dimethylene. Advantageously, at least 60% of the $R_1$ groups in the polycarbonate and preferably all the groups $R_1$ are aromatic groups of formula:

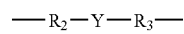

in which $R_2$ et $R_3$ are divalent monocyclic aromatic radicals and Y is a linking radical in which one or two atoms separate $R_2$ and $R_3$. The free valences are generally in the meta or para position with respect to Y. $R_2$ and $R_3$ may be substituted or unsubstituted phenylenes; as substituents, mention may be made of alkyl, alkenyl, halogen, nitro and alkoxy. Preferably, the phenylenes are unsubstituted; they may be together or separately meta or para and are preferably para. The linking radical Y is preferably such that one atom separates $R_2$ from $R_3$ and is preferably a hydrocarbon radical such as methylene, cyclohexylmethylene, 2-[2.2.1]bicyclo-heptylmethylene, ethylene, 2,2-propylene, 1,1-(2,2-dimethylpropylene), 1,1-cyclohexylene, 1,1-cyclopentadecylene, cyclododecylene, carbonyl, the oxy radical, the thio radical and sulfone. Preferably, $R_1$ is 2,2-bis(4-phenylene)propane which comes from bisphenol A, that is to say Y is isopropylidene and $R_2$ and $R_3$ are each p-phenylene. Advantageously, the intrinsic viscosity of the polycarbonate, measured in methylene chloride at 25° C., is between 0.3 and 1 dl/g.

The proportion of polycarbonate may represent up to 30 parts per 100 parts of thermoplastic polyester.

With regard to the core-shell copolymer (A), this is in the form of fine particles having an elastomer core and at least one thermoplastic shell, the particle size being generally less than 1 μm and advantageously between 200 and 500 nm. By way of example of the core, mention may be made of isoprene homopolymers or butadiene homopolymers, copolymers of isoprene with at most 30 mol % of a vinyl monomer and copolymers of butadiene with at most 30 mol % of a vinyl monomer. The vinyl monomer may be styrene, an alkylstyrene, acrylonitrile or an alkyl(meth)acrylate. Another core family consists of the homopolymers of an alkyl (meth)acrylate and the copolymers of an alkyl(meth) acrylate with at most 30 mol % of a vinyl monomer. The alkyl(meth)acrylate is advantageously butyl acrylate. The vinyl monomer may be styrene, an alkylstyrene, acrylonitrile, butadiene or isoprene. The core of the copolymer (A) may be completely or partly crosslinked. All that is required is to add at least difunctional monomers during the preparation of the core; these monomers may be chosen from poly(meth)acrylic esters of polyols, such as butylene di(meth)acrylate and trimethylolpropane trimethacrylate. Other difunctional monomers are, for example, divinylbenzene, trivinylbenzene, vinyl acrylate and vinyl methacrylate. The core can also be crosslinked by introducing into it, by grafting or as a comonomer during the polymerization, unsaturated functional monomers such as anhydrides of unsaturated carboxylic acids, unsaturated carboxylic acids and unsaturated epoxides. Mention may be made, by way of example, of maleic anhydride, (meth)acrylic acid and glycidyl methacrylate.

The shell(s) are styrene homopolymers, alkylstyrene homopolymers or methyl methacrylate homopolymers, or copolymers comprising at least 70 mol % of one of the above monomers and at least one comonomer chosen from the other above monomers, vinyl acetate and acrylonitrile. The shell may be functionalized by introducing into it, by grafting or as a comonomer during the polymerization, unsaturated functional monomers such as anhydrides of unsaturated carboxylic acids, unsaturated carboxylic acids and unsaturated epoxides. Mention may be made, for example, of maleic anhydride, (meth)acrylic acid and glycidyl methacrylate. By way of example, mention may be made of core-shell copolymers (A) having a polystyrene shell and core-shell copolymers (A) having a PMMA shell. There are also core-shell copolymers (A) having two shells, one made of polystyrene and the other, on the outside, made of PMMA. Examples of copolymers (A) and their method of preparation are described in the following patents: U.S. Pat. No. 4,180,494, U.S. Pat. No. 3,808,180, U.S. Pat. No. 4,096,202, U.S. Pat. No. 4,260,693, U.S. Pat. No. 3,287,443, U.S. Pat. No. 3,657,391, U.S. Pat. No. 4,299,928 and U.S. Pat. No. 3,985,704.

Advantageously, the core represents, by weight, 70 to 90% of (A) and the shell represents 30 to 10%.

By way of example of a copolymer (A), mention may be made of that consisting (i) of 75 to 80 parts of a core comprising at least 93 mol % of butadiene, 5 mol % of styrene and 0.5 to 1 mol % of divinylbenzene and (ii) of 25 to 20 parts of two shells essentially of the same weight, the inner one made of polystyrene and the outer one made of PMMA.

With regard to ethylene-unsaturated carboxylic acid anhydride copolymers (B1), these may be polyethylenes grafted by an unsaturated carboxylic acid anhydride or ethylene-unsaturated carboxylic acid anhydride copolymers which are obtained, for example, by radical polymerization.

The unsaturated carboxylic acid anhydride may be chosen, for example, from maleic, itaconic, citraconic, allylsuccinic, cyclohex-4-ene-1,2-dicarboxylic, 4-methylenecyclohex-4-ene-1,2-dicarboxylic, bicyclo-[2.2.1]hept-5-ene-2,3-dicarboxylic and x-methylbicyclo[2.2.1]hept-5-ene-2,2-dicarboxylic anhydrides. Advantageously, maleic anhydride is used. It would not be outside the scope of the invention to replace all or part of the anhydride with an unsaturated carboxylic acid such as, for example, (meth)acrylic acid.

With regard to the polyethylenes onto which the unsaturated carboxylic acid anhydride is grafted, the term "polyethylene" should be understood to mean homopolymers or copolymers.

By way of comonomers, mention may be made of:

alpha-olefins, advantageously those having from 3 to 30 carbon atoms; by way of examples of alpha-olefins, mention may be made of propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene and 1-triacontene; these alpha-olefins may be used separately or as a mixture of two or more of them;

esters of unsaturated carboxylic acids, such as, for example, alkyl (meth)acrylates, the alkyls possibly having up to 24 carbon atoms; examples of alkyl acrylates or methacrylates are especially methyl methacrylate, ethyl acrylate, n-butyl acrylate, isobutyl acrylate and 2-ethylhexyl acrylate;

vinyl esters of saturated carboxylic acids, such as, for example, vinyl acetate or vinyl propionate;

dienes such as, for example, 1,4-hexadiene.

The polyethylene may include several of the above comonomers.

Advantageously, the polyethylene, which may be a blend of several polymers, comprises at least 50 mol % and preferably 75 mol % of ethylene and its density may be between 0.86 and 0.98 g/cm³. The MFI (Melt Flow Index at 190° C./2.16 kg) is advantageously between 0.1 and 1000 g/10 min. By way of example of polyethylenes, mention may be made of:

low-density polyethylene (LDPE)

high-density polyethylene (HDPE)

linear low-density polyethylene (LLDPE)

very low-density polyethylene (VLDPE)

polyethylene obtained by metallocene catalysis, that is to say polymers obtained by the copolymerization of ethylene and of an alpha-olefin such as propylene, butene, hexene or octene in the presence of a single-site catalyst generally consisting of a zirconium or titanium atom and of two alkyl cyclic molecules linked to the metal. More specifically, the metallocene catalysts are usually composed of two cyclopentadiene rings linked to the metal. These catalysts are frequently used with aluminoxanes as cocatalysts or activators, preferably methylaluminoxane (MAO). Hafnium may also be used as the metal to which the cyclopentadiene is fixed. Other metallocenes may include transition metals of Groups IV A, V A and VI A. Metals from the series of lanthamides may also be used.

EPR (ethylene-propylene-rubber) elastomers;

EPDM (ethylene-propylene-diene) elastomers;

blends of polyethylene with an EPR or an EPDM;

ethylene-alkyl(meth)acrylate copolymers possibly containing up to 60%, and preferably 2 to 40%, by weight of (meth)acrylate.

The grafting is an operation known per se.

With regard to the ethylene-unsaturated carboxylic acid anhydride copolymers, that is to say those in which the unsaturated carboxylic acid anhydride is not grafted, these are copolymers of ethylene, the unsaturated carboxylic acid anhydride and, optionally another monomer which may be chosen from the comonomers that were mentioned above in the case of the ethylene copolymers intended to be grafted.

Advantageously, ethylene-maleic anhydride copolymers and ethylene-alkyl (meth)acrylate-maleic anhydride copolymers are used. These copolymers comprise from 0.2 to 10% by weight of maleic anhydride and from 0 to 40%, preferably 5 to 40%, by weight of alkyl(meth)acrylate. Their MFIs are between 0.5 and 200 (190° C./2.16 kg). The alkyl(meth) acrylates have already been described above. It is possible to use a blend of several copolymers (B1), and it is also possible to use an ethylene-maleic anhydride copolymer/ethylene-alkyl(meth)acrylate-maleic anhydride copolymer blend.

The copolymer (B1) is commercially available, produced by radical polymerization at a pressure which may range between 200 and 2500 bar and is sold in the form of granules.

With regard to the ethylene-unsaturated epoxide copolymers (B2), these may be obtained by the copolymerization of ethylene with an unsaturated epoxide or by grafting the unsaturated epoxide to the polyethylene. The grafting may be carried out in the solvent phase or onto the polyethylene in the melt in the presence of a peroxide. These grafting techniques are known per se. With regard to the copolymerization of ethylene with an unsaturated epoxide, it is possible to use so-called radical polymerization processes usually operating at pressures between 200 et 2500 bar.

By way of example of unsaturated epoxides, mention may be made of:

aliphatic glycidyl esters and ethers, such as allyl glycidyl ether, vinyl glycidyl ether, glycidyl maleate, glycidyl itaconate, glycidyl acrylate and glycidyl methacrylate; and alicyclic glycidyl esters and ethers, such as 2-cyclohex-1-ene glycidyl ether, diglycidyl cyclohexene-4-5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

With regard to grafting, the copolymer is obtained by grafting an ethylene homopolymer or copolymer as described in the case of (B1), except that an epoxide is grafted instead of an anhydride. With regard to copolymerization, this is also similar to (B1) except that an epoxide is used; it may also have other comonomers, as in the case of (B1).

The product (B2) is advantageously an ethylene-alkyl (meth)acrylate-unsaturated epoxide copolymer or an ethylene-unsaturated epoxide copolymer. Advantageously, it may contain up to 40%, preferably 5 to 40%, by weight of alkyl(meth)acrylate and up to 10%, preferably 0.1 to 8%, by weight of unsaturated epoxide.

Advantageously, the epoxide is glycidyl(meth)acrylate.

Advantageously, the alkyl(meth)acrylate is chosen from methyl (meth)acrylate, ethyl acrylate, n-butyl acrylate, isobutyl acrylate and 2-ethylhexyl acrylate. The amount of alkyl(meth)acrylate is advantageously from 20 to 35%. The MFI is advantageously between 0.5 and 200 (in g/10 min. at 190° C./2.16 kg). It is possible to use a blend of several copolymers (B2), and it is also possible to use an ethylene-alkyl (meth)acrylate-unsaturated epoxide copolymer/ethylene-unsaturated epoxide copolymer blend. It is also possible to use blends of (B1) and (B2).

This copolymer (B2) may be obtained by radical polymerization of the monomers.

Advantageously, the thermoplastic polyester compositions of the invention comprise, per 100 parts by weight, 75 to 95 parts of polyester for 25 to 5 parts of impact modifier, respectively.

Advantageously, the proportions of (A) and (B) are such that the (B)/(A) ratio is between 40/60 and 25/75, whatever the amount of impact modifier in the polyester.

Among the copolymers (B), it is advantageous to use the copolymers (B2).

The invention also relates to an impact-modifier composition having these proportions.

The thermoplastic polyesters of the invention may also include, in addition to the impact modifier, slip agents, antiblocking agents, antioxidants, UV stabilizers and fillers. The fillers may be glass fibres, fire retardants, talc or chalk.

The thermoplastic polyester/impact-modifier blends are prepared by the usual techniques for thermoplastic polymers in single-screw or twin-screw extruders, mixers or apparatuses of the BUSS® Ko-kneader type. The polyester and the constituents of the impact modifier, namely the copolymers (A), (B) and (C), may be introduced separately into the blending device. The constituents of the impact modifier may also be added in the form of a blend prepared in advance, possibly in the form of a masterbatch in the polyester. The additives may be added into these apparatuses, such as the slip agents, the antiblocking agents, the antioxidants, the UV stabilizers and the fillers, whether as they are or in the form of a masterbatch in the polyester or else in the form of a masterbatch with one or more of the copolymers (A) to (C). The impact-modifier composition comprising (A) to (C) which may be added to the polyesters is also prepared by the previous usual technique of blending thermoplastic polymers.

EXAMPLES

The following products were used:

AX 8900: ethylene-methyl acrylate-glycidyl methacrylate (GMA) copolymer comprising, by weight, 25% acrylate and 8% GMA, having an MFI of 6 (190° C./2.16 kg). It is sold under the brand name LOTADER® par Elf Atochem;

AX 8930: ethylene-methyl acrylate-glycidyl methacrylate (GMA) copolymer comprising, by weight, 25% acrylate and 3% GMA, having an MFI of 6 (190° C./2.16 kg). It is sold under the brand name LOTADER® par Elf Atochem;

E920: MBS-type core-shell copolymer with a core essentially based on butadiene-styrene and a shell of PMMA, sold by Elf Atochem under the brand name METABLEND®;

EXL 2314: epoxy-functionalized acrylic core-shell copolymer sold by Röhm and Haas under the brand name PARALOID®;

PBT: polybutylene terephthalate having an MFI of 20 (250° C./2.16 kg) sold by BASF under the brand name ULTRADUR® B4500.

All the examples were produced with compositions comprising 80% by weight of PBT and 20% by weight of impact modifier. The notched Charpy impact strength complies with the ISO 179:93 standard; the higher the value the better the impact strength.

FIG. 1 shows the notched Charpy impact strength at −40° C. for PBT containing impact modifier consisting either of AX or of core-shell copolymer or of their blends. Two kinds of AX: AX 8900 and AX 8930 and two kinds of core-shell copolymer: EXL 2314 and E920 were used. FIG. 2 shows the impact strengths of these same compositions at +23° C. In these figures and in the tables, the epoxide copolymer has been denoted by AX and the core-shell copolymer by CS. The AX/CS ratio is the weight ratio, "30/70" meaning 30 parts of AX to 70 parts of CS. The values are also given in TABLE 1 and TABLE 2.

TABLE 1

| PBT + 20%(AX + CS) AX = AX 8900 or AX 8930 CS = EXL 2314 or E920 | Notched Charpy impact strength at −40° C. | | | |
| --- | --- | --- | --- | --- |
| | AX 8900 EXL 2314 | AX 8900/ E920 | AX 8930 EXL 2314 | AX 8930/ E920 |
| 100/0 AX/CS (comparative) | 6.2 | 6.2 | 5 | 5 |
| 70/30 AX/CS (comparative) | 9.8 | 10 | 8.8 | 9.9 |
| 30/70 AX/CS | 7.8 | 14.75 | 7.1 | 9.8 |
| 20/80 AX/CS | 9.2 | 10.25 | | |
| 10/90 AX/CS | | 13.8 | | |
| 0/100 AX/CS (comparative) | 6.75 | 8.2 | 6.75 | 8.2 |

TABLE 2

| PBT + 20%(AX + CS) AX = AX 8900 or AX 8930 CS = EXL 2314 or E920 | Notched Charpy impact strength at +23° C. | | | |
| --- | --- | --- | --- | --- |
| | AX 8900 EXL 2314 | AX 8900/ E920 | AX 8930 EXL 2314 | AX 8930/ E920 |
| 100/0 AX/CS (comparative) | 76.4 | 76.4 | 55.2 | 55.2 |
| 70/30 AX/CS (comparative) | 99 | 62.2 | 67.5 | 61 |
| 30/70 AX/CS | 91.8 | 88.9 | 82.6 | 88.4 |
| 20/80 AX/CS | 87.6 | 79.5 | | |
| 10/90 AX/CS | | 80 | | |
| 0/100 AX/CS (comparative) | 62 | 18 | 62 | 18 |

FIG. 3 shows the MFI of the above compositions containing the various impact modifiers and also the MFI of the PBT without a modifier: "pure PBT". The values are also given in TABLE 3 below.

TABLE 3

| PBT + 20%(AX + CS) AX = AX 8900 or AX 8930 CS = EXL 2314 or E920 | MFI (250° C./2.16 kg) no change with the type of AX and CS |
| --- | --- |
| 100/0 AX/CS (comparative) | 0.63 |
| 70/30 AX/CS (comparative) | 0.9 |
| 30/70 AX/CS | 1.63 |
| 20/80 AX/CS | 3.5 |
| 10/90 AX/CS | 3 |
| 0/100 AX/CS (comparative) | 7.4 |
| Pure PBT (comparative) | 20 |

It is within the skill in the art to practice this invention in numerous modifications and variations in light of the above teachings. Therefore, it is understood that the various embodiments of this invention described herein may be altered without departing from the spirit and scope of this invention as defined by the appended claims.

The invention claimed is:

1. Thermoplastic polyester compositions comprising, by weight:
    (i) from 60 to 98% by weight of a thermoplastic component consisting of a thermoplastic polyester; and
    (ii) from 2 to 40% by weight of an impact modifier consisting of:
       (a) a core-shell copolymer (A) having a single shell; wherein the core consists of one or more polymers selected from the group consisting of isoprene homopolymers, copolymers of isoprene with at most 30 mol % of a vinyl monomer selected from the group consisting of styrene, alkylstyrene and alkyl(meth) acrylate, copolymers of butadiene with at most 30 mol % of an alkyl(meth)acrylate, and copolymers of alkyl (meth)acrylate with more than 0 mol % and at most 30 mol % of a vinyl monomer selected from the group consisting of styrene and alkylstyrene; further wherein the shell consists of one or more polymers selected from the group consisting of styrene homopolymers, alkylstyrene homopolymers, methyl methacrylate homopolymers, and copolymers consisting of at least 70 mol % of a styrene, alkyl styrene or methyl methacrylate with at most 30 mol % of a vinyl acetate; and
       (b) an ethylene copolymer (B) chosen from ethylene-unsaturated epoxide copolymers (B2);
    (iii) the (B2)/(A) ratio being between 40/60 and 10/90 for proportions of impact modifier between 18 and 40% in 82 to 60% of polyester, respectively;
    (iv) the (B2)/(A) ratio being between 40/60 and 25/75 for proportions of impact modifier between 2 and 18% in 98 to 82% of polyester, respectively.

2. Compositions according to claim 1, wherein the polyester is selected from PET and PBT.

3. Compositions according to claim 1, comprising up to 30 parts by weight of copolyetherester per 100 parts of thermoplastic polyester.

4. Compositions according to claim 1, comprising up to 30 parts by weight of polycarbonate per 100 parts of thermoplastic polyester.

5. Compositions according to claim 1, wherein the copolymer (A) comprises an elastomer core and one thermoplastic shell.

6. Compositions according to claim 1, wherein the ethylene-unsaturated epoxide copolymers (B2) are ethylene-alkyl(meth)acrylate-unsaturated epoxide copolymers obtained by copolymerization of the monomers and contain from 0 to 40% by weight of alkyl(meth)acrylate and up to 10% by weight of unsaturated epoxide.

7. Compositions according to claim 1, comprising, per 100 parts by weight, 75 to 95 parts of polyester for 25 to 5 parts of impact modifier, respectively.

* * * * *